Figure 1:
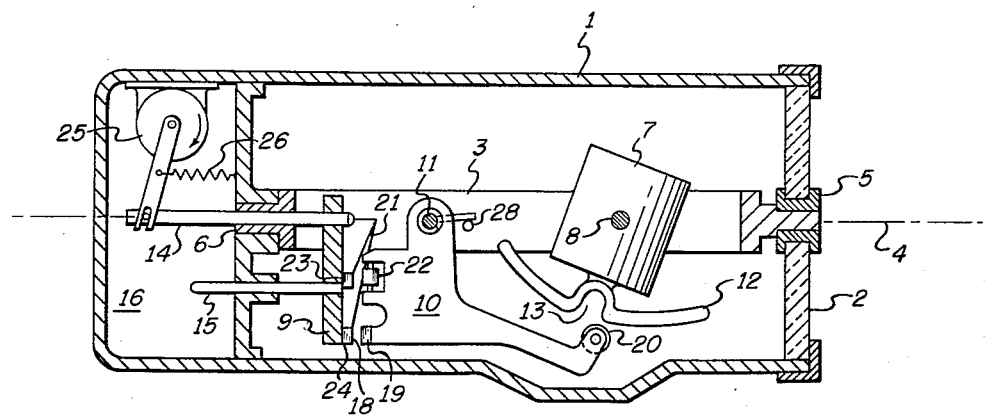

Nov. 22, 1960  A. P. GLENNY ET AL  2,960,874
GYROSCOPE CENTRING AND CAGING APPARATUS
Filed Aug. 19, 1959  2 Sheets-Sheet 2

INVENTORS
ARTHUR P. GLENNY
MICHAEL B. COTTEN
BY
ATTORNEY

United States Patent Office 2,960,874
Patented Nov. 22, 1960

2,960,874

GYROSCOPE CENTRING AND CAGING APPARATUS

Arthur Philip Glenny, Camberley, and Michael Ben Cotton, Appleton, England, assignors to The Sperry Gyroscope Company Limited, Brentford, Middlesex, England, a company of Great Britain Filed Aug. 19, 1959, Ser. No. 834,800

Claims priority, application Great Britain Aug. 26, 1958

10 Claims. (Cl. 74—5.1)

This invention relates to gyroscopic instruments having centring and caging apparatus.

The invention relates in particular to a gyroscopic instrument of the kind in which a rotor-bearing casing, containing a rotor, is mounted, by means of a gimbal ring, for angular displacement about two mutually perpendicular axes in an instrument housing or frame and the centring and caging apparatus is arranged to centre and lock the rotor-bearing casing with respect to one of the axes while simultaneously applying a brake to hold the rotor-bearing casing with respect to the other axis, thereby destroying the spatial rigidity of the gyroscope at the initiation of the centring operation and thereafter to free the rotor-bearing casing with respect to the last-mentioned axis and to centre and lock it with respect thereto.

In known gyroscopic caging apparatus, a cam that surrounds the outer gimbal axis is mounted upon a gimbal ring. The cam is movable in the general direction of the outer axis and is connected to a brake mechanism for locking the gyroscope about the outer axis whereby when a cam follower is urged against the cam, the cam first moves to operate the brake mechanism whereupon the cam and cam follower become effective to centre the gyroscope about the outer axis. The cam follower then falls into a slot in the cam, so caging the gyroscope about the outer axis and releasing the brake. A further cam mechanism then operates in response to the falling of the cam follower into the slot to centre and cage the gyroscope about the inner axis.

According to the present invention there is provided a gyroscopic instrument including an instrument frame or housing, a gimbal ring pivotally mounted in the housing to rotate about an outer axis, a rotor-bearing casing for the gyroscope rotor pivotally mounted in the gimbal ring to rotate about an inner axis perpendicular to the outer axis and to the rotor axis, and caging and centring apparatus for the rotor-bearing frame being characterized in that said caging and centring apparatus includes a first movable member carrying a braking element and arranged to be moved with relation to the housing or frame without any component of rotation about the outer axis. A second movable member carries a second braking element for engagement with the first braking element, the second member being arranged to have no component of rotation about the outer axis with respect to the gimbal ring so that the mutual engagement of the braking elements lock the gyroscope about its outer axis. A cam and cam follower mechanism mechanically connected to the second movably member and to the rotor casing apply the force of the engaged braking elements to centre the gyroscope about its inner axis, the cam of the cam and cam follower mechanism having a slot which the cam follower enters to cage the gyroscope about the inner axis when the gyroscope is centred. The second movable member of the combination is pivotally mounted on the ring and includes an outer axis cam follower.

The braking element and the outer axis cam follower are so arranged on the member that as the member moves about its axis when the inner axis follower enters the centring slot such movement results in the disengagement of the braking elements and engagement of the outer axis cam follower with a cam carried by the first member. The cam on the first member and the engaged out axis cam follower then operate to centre the gyroscope about its outer axis.

In order that the invention may be clearly understood and readily carried into practice, two specific embodiments thereof will now be described by way of example with reference to the accompanying drawings.

Figure 2:
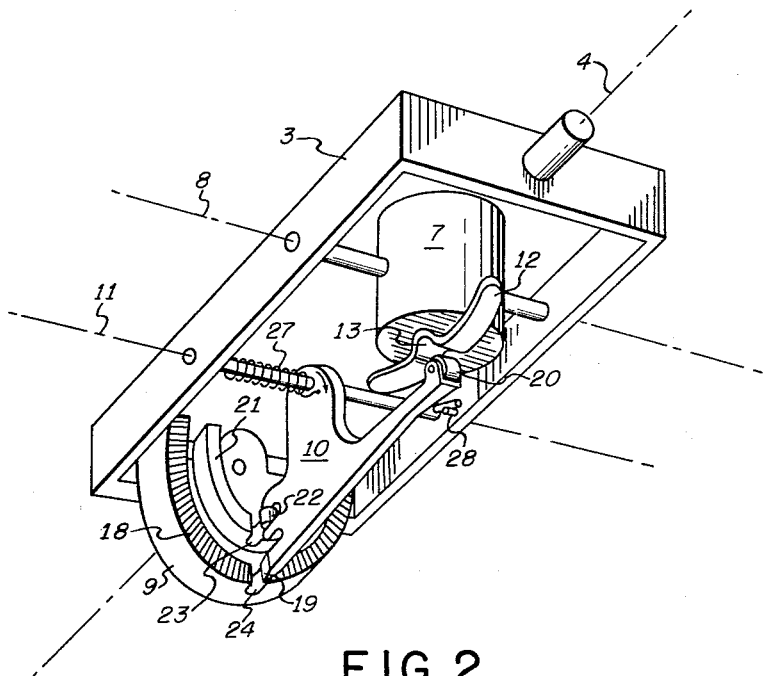
Figure 3:
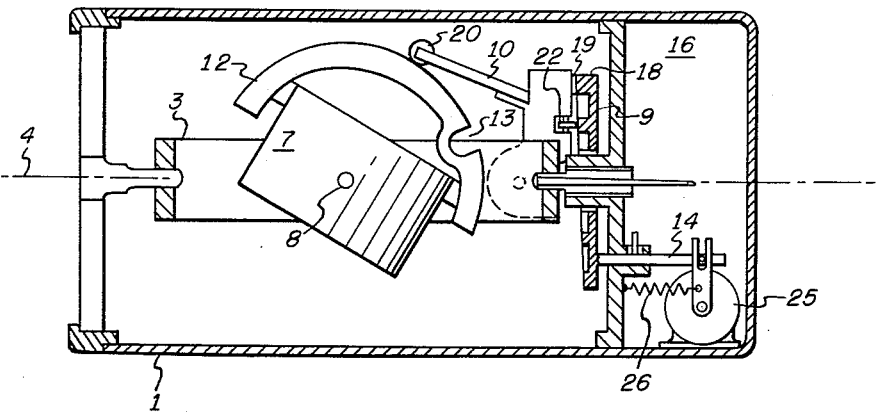
Figure 4:
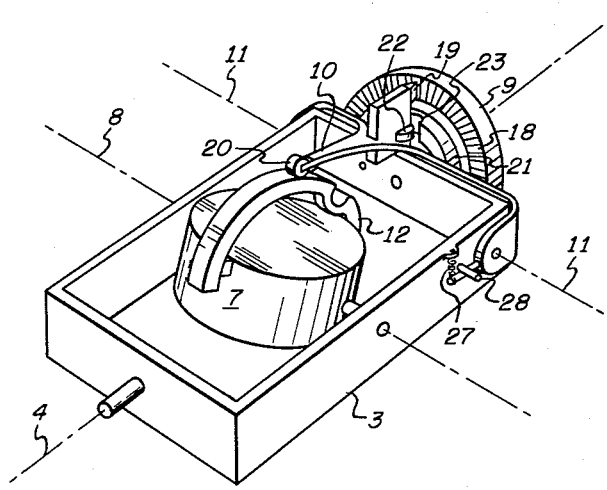

In the drawings Figure 1 is a partly sectional side elevation of a gyroscopic artificial horizon according to the invention, while Figure 2 is a perspective view of the caging apparatus and certain other parts of the artificial horizon of Figure 1 as seen from below. Figures 3 and 4 are similar illustrations of a second embodiment.

It should be understood that the drawings are somewhat diagrammatic in order that the construction and arrangement of the caging apparatus, with which the invention is primarily concerned, may be more readily understood.

Referring now to Figure 1, the artificial horizon includes an instrument frame or housing 1 provided at one end with a glass window 2. A gimbal ring 3 is mounted to pivot about an outer or ring axis 4 by means of a bearing 5 at the centre of window 2 and a further bearing 6 at the other end of the housing.

A gyroscope rotor (not shown) is mounted within a rotor bearing casing 7 and is arranged to be rotated therein in a known manner. The rotor bearing casing is mounted with freedom in relation to the gimbal ring about an inner gimbal axis 8.

A number of other parts are omitted in order to simplify the drawing. These include erecting means for the gyroscope, a movable horizon bar behind the window 2, the representation of an aircraft mounted on the window to be viewed in relation to the horizon bar, and a mechanism for appropriately moving the horizon bar in response to relative angular movement between the rotor bearing casing 7 and the instrument housing 1. The horizon bar is centrally divided to pass the bearing 5, and a mask in the form of a disc is mounted on the end of the gimbal frame nearer the window to provide a background to the horizon bar. The ways in which these parts can be arranged and constructed are well known to persons skilled in the art. The instrument is intended to be mounted in an aircraft with its outer gimbal axis 4 substantially aligned with the longitudinal axis of the aircraft and with the glass window facing rearwardly towards the pilot so that he observes the horizon bar through the window.

The present invention is particularly concerned with the centring and caging apparatus of the gyroscope. This apparatus is best understood by reference to both figures, and comprises three principal parts, a first member 9 which is arranged to slide longitudinally of the instrument housing 1 along the ring axis 4, a second member 10 which is pivoted to the gimbal ring 3 about an axis 11 parallel with the inner gimbal axis 8 of the casing 7, and a cam 12 which is secured to the rotor bearing casing 7 and extends in a plane perpendicular to the inner gimbal axis 8. The cam 12 is provided at the centre of its periphery with a slot 13.

The first member 9 is generally in the form of a semi-circular plate having its axis coincident with the outer gimbal or ring axis 4. An operating shaft 14 (Figure 1) passes concentrically through the trunnion of outer axis bearing 6, while a pin 15 is arranged as shown to prevent relative rotation between the member 9 and the instrument housing 1.

At its left-hand end, as seen in Figure 1, the instrument housing 1 is provided with a chamber 16 which contains an electrically operated motor 25 and a return spring 26 for moving the member 9 towards the right to centre and cage the gyroscope and to the left to uncage the gyroscope. The return spring 26 and the motor 25 both operate on the member 9 by way of shaft 14 which extends into the chamber 16. Preferably the motor 25 is arranged when energized to move the member 9 to the left to uncage the gyroscope, so that centring and caging is effected by the return spring 26 urging member 9 to the right when the motor is de-energized. Alternatively the motor 25 could be arranged to be energized to cage the gyroscope and the return spring 26 to uncage the gyroscope when the motor is de-energized.

A further spring 27 which is light in comparison with the return spring 26 is arranged to exert a clockwise torque (as viewed in Figure 1) on the second member 10 whereby it tends to follow member 9 when the latter is moved to the left by the motor, and hence moves clear of the cam 12. A stop 28 is provided to limit the extent to which the member 10 is moved by this further spring 27 so that when the motor 25 is energized the member 9 eventually moves clear of the member 10.

Arranged around the periphery of the first member 9 is a braking element 18 in the form of an axially extending rim provided with serrations directed radially. The surface providing the serrations does not lie in a plane perpendicular to the outer gimbal axis, but the reason for this will be explained later. The second member 10 carries a knife edge 19 which lies on a line passing through the outer gimbal axis and constitutes a further braking element, while at its right hand extremity (as seen in Figure 1) the same member carries a cam follower which co-operates with cam 12 and is constituted by a roller 20.

The first part of the centring and caging operation can now be described. Upon de-energization of the motor 25, the first member 9 is moved to the right (as seen in Figure 1) by the return spring 26 and forces the second member 10 to rotate counter-clockwise about axis 11 so that the cam follower 20 bears against the surface of cam 12. The reaction between the first and second members occurs at the braking elements 18 and 19 with the result that the gimbal ring 3 and casing 7 are prevented from moving about the outer gimbal axis 4. A tangential component of force between cam 12 and cam follower 20 turns the rotor bearing casing 7 into a position with the rotor axis precisely or approximately (according to the design) perpendicular to the outer or ring axis 4. The cam follower 20 thereupon falls into the slot 13 to cage the gyroscope in its centralised position about the inner or casing axis 8.

Owing to a well known property of the gyroscope, the torque necessary to turn the rotor about the inner axis 8 has to be exerted about the outer axis 4. This torque is furnished by the tangential reaction between the braking elements 18 and 19.

Referring again to the construction of the first member 9, this is provided with a cam surface 21 (best seen in Figure 2) arranged concentrically of the braking element 18 and lying at a smaller radius from the outer gimbal axis 4. A cam follower arranged to co-operate with the cam surface 21 is constituted by a roller 22 carried by the second member 10.

The cam surface 21 and the serrated surface of the braking element 18 are so related to pivot member 10 that whenever the cam follower 20 engages the surface of cam 12 (i.e. is not in the slot 13) the cam surface 21 and follower 22 remain spaced apart by a small distance while the braking elements 18 and 19 are in mutual engagement. However, when the follower 20 enters the slot 13, a small angular displacement of the second member 10 takes place in a counter-clockwise direction about the axis 11 (Figure 1).

This angular displacement is sufficient to separate the braking elements 18 and 19 so that the force between the first and second members then occurs at a reaction between the cam surface 21 and follower 22. The disengagement of the braking elements and engagement of the roller 22 and cam surface 21 occurs with the displacement of the member 10 as roller 20 enters into the slot 13 because the respective knife edge 19 and roller 22 are so arranged on member 10 with respect to axis 11 that the knife edge at a further distance from the axis 11 than the roller 22 moves through a longer arc than that of the roller. Accordingly, as the displacement of member 10 occurs, the cam surface 21 and roller 22 become engaged and the braking elements 18 and 19 become disengaged. As the cam surface 21 is suitably formed for the purpose, a tangential component of force is exerted on the follower 22 in such a direction as to rotate the gimbal ring 33 and casing 7 into a centralised position about the axis 4. The torque necessary to turn the ring 3 about the outer axis is of course provided about the inner axis 8 by a reaction between the cam follower 20 and slot 13.

When the gimbal ring 3 moves into the centralized or caged position with relation to the frame 1, the cam follower 22 enters a slot 23 formed to receive it in the centre of the cam surface 21.

It is necessary to ensure that, for all angular positions of the gimbal ring 3 about the outer gimbal axis 4, except the centralised position, the first contact which occurs between first member 9 and second member 10 when the caging operation is initiated takes place between the braking elements 18 and 19. It is also desirable that when the first stage of the caging process is completed by the entry of roller 20 into slot 11, with consequent disengagement of the braking elements, very little further motion of the first member 9 is then required to bring the cam surface 21 into engagement with the roller 22. Accordingly the serrated surface constituting the first braking element 18 is preferably formed by cutting slots in a surface originally formed on the member 9 to conform exactly with the cam surface 21, that is, to have in each angular position around the outer axis the same rise as the cam surface 21. It follows that if the knife edge 19 constituting the further braking element is positioned relatively to the roller 22 so that in one angular position of the gimbal ring about the outer axis the knife edge bottoms in one serration leaving a small spacing between roller 22 and cam 21 (assuming that the cam follower 20 is at a given position on the surface of cam 12) the same spacing occurs between roller 22 and cam 21 in any other angular position of the gimbal ring, other than in the centralised position.

A slot 24 corresponding to the slot 23 in the cam surface 21 is formed in the first braking element 18 so that the entry of the roller 22 into the slot 23 is not prevented by mutual engagement of the braking elements when the gimbal ring 3 is centred about the outer axis. Thus, if the ring 3 should be already precisely centred about the outer axis when the centring and caging operation begins, the braking elements do not come into engagement but caging about the inner axis is at once effected by the entry of roller 22 into slot 23. The reaction between the roller 22 and the base of the slot 23 results in a force between roller 20 and cam 12 whereby the casing 7 is then centred and caged about the inner axis.

The centring and caging apparatus shown is adapted to centre a gyroscope in which the angular displacement of the rotor casing 7 about the inner and outer axes is limited by stops or the like which are not shown in the drawing. It will be obvious to persons skilled in the art that the centring and caging apparatus can readily be modified to make it suitable for a gyroscope in which unlimited angular displacement can take place about one or both of the inner and outer axes. Thus, if complete freedom about the inner axis 8 is permitted, then the cam 12 can be extended so as to surround the axis 8 completely.

The other embodiment of the invention illustrated in Figures 3 and 4 operates in the same manner as the embodiment of Figures 1 and 2 and like parts used in the two embodiments have been identified by like reference numerals. The main differences are that the first member 9 is basically circular instead of semi-circular and the cam surface 21 and the first braking element 18 are extended to surround the outer axis completely. Moreover, as will be seen, the member 9 and the element 18 are mounted outside the gimbal ring 3 and the shaft 14 is no longer coaxial with the outer axis 4. This arrangement permits complete freedom for relative rotation between the gimbal ring 3 and the housing 1 about the axis 4.

Another minor difference is that the slot 24 in the member 9 of Figures 1 and 2 has been omitted in Figures 3 and 4 and the slot 23 and roller 22 are of such dimensions that the roller only partly enters the slot to lock the gimbal ring about the axis 4.

What is claimed is.

1. In a gyroscopic instrument having a fixed frame, a gimbal ring mounted on the frame with freedom about an outer axis, and a rotor casing mounted on the ring with freedom about an inner axis perpendicular to the outer axis; caging means including a cam with a centring slot movable with the casing about its inner axis, a slide member mounted on the frame to move with relation to the ring along the outer axis having a braking element and an outer axis cam with a centring slot; a member pivoted on the ring having a follower for the inner axis cam, a second braking element cooperating with the braking element on the slide member to engage the inner axis follower and cam to cage the casing about its inner axis with the follower in the centring slot of the cam, and a follower for the outer axis cam; said outer axis follower and second braking element being so arranged on the pivot member with relation to its axis that as the inner axis follower enters the centring slot in the inner axis cam the member moves to disengage the braking elements and engage the outer axis cam of the slide member and the outer axis follower on the ring to cage the ring about its outer axis with the follower in the centring slot of the cam, and means for operating said slide member.

2. An instrument as claimed in claim 1, in which the outer axis cam is circular and concentric to the braking element on the slide member.

3. An instrument as claimed in claim 1, in which the first braking element is a serrated surface concentric to the outer axis, and the second braking element is a knife edge.

4. An instrument as claimed in claim 1, in which the axis of the member pivoted on the ring is parallel to the inner axis.

5. An instrument as claimed in claim 1, in which the first braking element includes a slot corresponding to the slot in the outer axis cam.

6. Apparatus for caging the rotor casing and gimbal ring of a gyroscopic instrument in centred relation to a fixed frame where the ring universally supports the casing about mutually perpendicular casing and ring axes including a centring cam movable with the casing about its axis, a member movable in relation to the frame along the axis of the ring having a braking element and a ring axis centring cam; a member pivoted on the ring having a follower for the casing axis cam, a second braking element cooperating with the braking element on the frame member to engage the casing axis follower and cam to cage the casing with relation to the ring, and a follower for the ring axis cam; said ring axis follower and second braking element being so arranged on the pivot member with relation to its axis that as the follower reaches the centring position of the casing axis cam the member moves to disengage the braking elements and engage the ring axis cam and the follower on the ring to cage the ring with relation to the frame, and means for operating said movable frame member.

7. Caging apparatus as claimed in claim 6, in which the centring cam for caging the ring with relation to the frame is circular and concentric to the braking element on the member movable along the axis of the ring.

8. Caging apparatus as claimed in claim 6, in which the first braking element is a serrated surface concentric to the ring axis, and the second braking element is a knife edge.

9. Caging apparatus as claimed in claim 6, in which the axis of the member pivoted on the ring is parallel to the casing axis.

10. Caging apparatus as claimed in claim 6, in which the surface of the first braking element conforms to the ring axis centring cam.

References Cited in the file of this patent

UNITED STATES PATENTS

| 2,580,748 | Fillebrown | Jan. 1, 1952 |
| 2,726,550 | Radkowski et al. | Dec. 13, 1955 |